(No Model.)

D. H. RICE.
SPINDLE AND SUPPORT THEREFOR.

No. 275,519. Patented Apr. 10, 1883.

Witnesses
Wm. B. Brown
N. P. Ockington

Inventor
David Hall Rice
by his Atty
Lepine C. Rice

UNITED STATES PATENT OFFICE.

DAVID H. RICE, OF LOWELL, MASSACHUSETTS.

SPINDLE AND SUPPORT THEREFOR.

SPECIFICATION forming part of Letters Patent No. 275,519, dated April 10, 1883.

Application filed March 7, 1881. (No model.)

*To all whom it may concern:*

Be it known that I, DAVID HALL RICE, of Lowell, county of Middlesex, and State of Massachusetts, have invented certain new and useful Improvements in Spindles and Supports therefor, of which the following is a specification.

My invention relates to spindles and their supports, as hereinafter described; and the objects of my improvements are to lessen and prevent the vibrations of the rail from being communicated to the dead-spindle and the vibration of the dead-spindle from being transmitted to the rail, to give the dead-spindle a better support, to decrease its length and vibration without lowering the point of support which it gives to the live-spindle, to prevent the oil from becoming fouled by the dust in the air of the mill, to protect the elastic packing from the injurious effect of the oil used in lubricating the spindle, and to permit of the proper adjustment of the spindle in relation to the ring within which it rotates.

This invention is an improvement upon the inventions shown in the Letters Patent of the United States granted to me September 24, 1872, No. 131,705, and February 18, 1873, No. 135,939, respectively, and it is designed to further carry out the purpose of the first of said patents by an additional shortening of the dead-spindle, without impairing the length of the bobbin and its consequent yarn-holding capacity, and of the second of said patents in preventing the access of the oil to the elastic support of the dead-spindle, as well as allow some adjustment of the whole spindle to the rail and spinning-ring, which it may need to compensate for slight imperfections in the practical application of such elastic packing in the new form. I attain these objects by the mechanisms illustrated in the accompanying drawings, in which—

Figure 1:
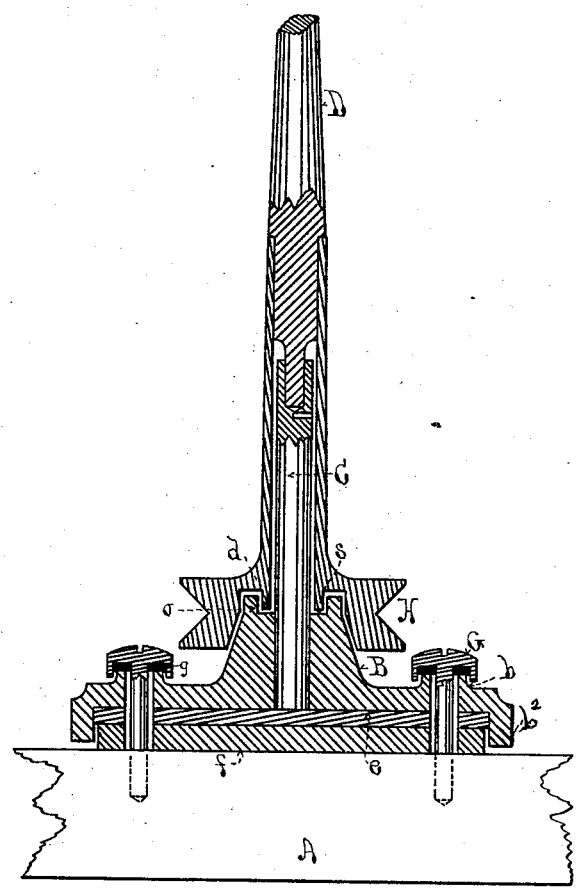
Figure 2:
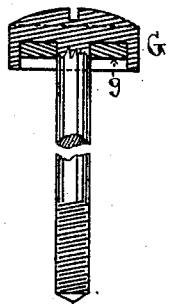
Figure 3:
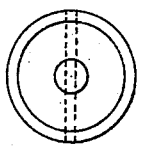

Figure 1 is a sectional elevation with the dead and live spindles in position. Fig. 2 is an enlarged sectional view of one of the bolts seen in Fig. 1, and Fig. 3 is an inverted plan of the same.

A is the rail which supports the spindle.

B is the base which sustains and supports the dead-spindle C.

D is the live-spindle rotating on the dead-spindle, and provided with the "whir" H.

$e$ is the rubber packing upon which the base B is placed. $f$ is a disk placed on the rail A, to elevate the rubber packing and prevent its coming in contact with any oil which may chance to fall upon the rail.

G G are the bolts which hold the base in position on the rail.

$b$ is a short sleeve formed on the base surrounding the hole through which the binding-bolt passes, which is made with a smaller external diameter than the head of the bolt, so that any oil that may flow from the spindle or fall upon the bolt-head will be prevented from passing down through the hole in the base and coming in contact with the rubber packing.

The base B is provided with the skirt $b^2$, which falls down around the packing and disk and prevents any overflowing oil from the spindle reaching the packing by passing over the outer edge of the base and inward along the under side to the packing. The base B, packing $e$, and disk $f$ are all provided with holes of greater diameter than the bolts G, so that by loosening the bolts the base B, and with it the spindle D, can be moved sidewise in any direction to adjust the spindle to the center of the ring within which it rotates, when, the bolts being again tightened, the spindle will be firmly held in that adjustment. The adjustment of the spindle in its ring can also be made by tightening in a varying degree the bolts G, which, by compressing the elastic packing under and between them, changes the position of the dead and the live spindles sidewise, accordingly bringing its top into the center of the traversing ring. The bolts G are provided with large heads, which have an annular groove cut in their under side, into which is placed a rubber washer, $g$, which comes in contact with the sleeve $b$ when the bolts are screwed down in place to hold the base, so that the bolster is then firmly held in position upon the rail without being in binding contact with metal at any point, and while being held with sufficient force to retain it firmly in place is given an elastic support in all directions, so that any vibration of the spindle caused by its rotation or communicated through or caused by its band will not be transmitted by the rail to other spindles, and any jar or vibration, caused by other mechanism, of the frame will not be transmitted to the spindle through the rail. Therefore each spindle of a frame runs substantially as though no other spindle was running near it or in the same frame, and the principal difficulty of operating the dead and live spindles—to wit, the aggregation of the vibration of the dead-spindles acting as vibrating tongues rigidly sustained at one of their ends until a degree of movement is produced in the whole structure which destroys the steadiness requisite for fine spinning—is obviated, and consequently an entire frame can be made to run as steadily as a single spindle of this kind.

The base B is of cast-iron, and is extended up around the dead-spindle C and in firm contact with it to a point within the whir, which is hollowed out for the purpose opposite the center of the groove in the whir in which the band driving the spindle runs when it is in operative position, and has upon its upper outer edge, extending up within the whir, a rim, $o$, which forms around the dead-spindle an oil-cup, $s$, into which the lower bearing, $d$, of the live-spindle D projects. The lower edge of the whir, by its rapid rotation, causes the air in contact with it to move outward, and the air rising around the bolster will thus be kept from contact with the oil in the oil-cup on the top of the base. The live-spindle D has its lower part made tubular, so as to rest upon the dead-spindle and rotate on it, and has attached near its lower end the whir H, which hangs like a skirt around and outside of the rim which forms the oil-cup on the upwardly-extending part of the base, and thus brings the center of the groove of its whir below the top of the oil-cup when the spindle is in operative position, and about on a plane with the point where the dead-spindle is supported by the cast-iron extension of the base. This supporting-point of the base on the dead-spindle may be carried higher within the whir, if found desirable. The lower end of the tubular part of the spindle, extending down within the oil cup, forms the lower bearing in contact with the dead-spindle, which receives the strain caused by the draft of the band running it, and, being almost directly within the plane of the band, prevents any leverage or undue wear upon either of the bearings.

By thus sustaining and supporting the dead-spindle up to a point which is as high as the plane of the band which drives the spindle I am enabled to make the dead-spindle much smaller, because with each reduction of its projecting length above the base support much more than a similar proportional reduction in its diameter can be made without impairing its stability and therefore with such lesser height the diameter of the dead-spindle can be very considerably less, and with it the frictional surfaces of the lower bearing of the live and dead spindles, which results in a much lighter-running spindle.

By carrying the supporting-point of the base B upon the dead-spindle up within the whir formed for that purpose I am enabled to reduce the length of the dead-spindle about one-fourth beyond what was possible with my improvement shown in my Letters Patent No. 131,705, of September 24, 1872, and thus carry out the purpose of shortening the dead-spindle there shown from the bottom end of its projecting part as well as from the top end, as in my former patent.

The combination and arrangement of the rubber packing with the base in the manner described also tends to steady the dead-spindle and prevent its vibration, as has been shown, and these two improvements in the different parts of the structure thus unite and mutually assist each other in effecting the ultimate result, which is the purpose of their invention.

What I claim as new and of my invention is—

1. The combination of the rail A and base B, provided with the dead-spindle C, with the elastic packing $e$ and bolts G, substantially as described.

2. The combination of the rail A and base B, provided with the dead-spindle C, with the bolts G and elastic packings $e$ and $g$, substantially as described—that is to say, so that the base shall rest upon the packing $e$ and the bolts shall bear upon the base through the medium of the packing $g$.

3. The combination of the bolts G, rail A, and packing $e$ with the base B, provided with the dead-spindle C, and having holes in it of greater diameter than the shanks of the bolts, substantially as described.

4. The combination of the rail A and bolts G with the packing $e$, disk $f$, and base B, provided with the dead-spindle C, substantially as described.

5. The combination of the rail A and base B, provided with the skirt $b^2$ and dead-spindle C, with the packing $e$ and bolts G, substantially as described.

6. The combination of the rail A and base B, provided with the dead-spindle C, with the bolts G, provided with overhanging heads, and the elastic packing $g$, substantially as described.

7. The combination of the live-spindle D, provided with the whir H, with the dead-spindle C and base B, substantially as described—that is to say, so that the dead-spindle will be supported by the base at or near the plane of the middle of the groove in the whir of the live-spindle when it is in operative position.

8. The combination of the base B, dead-spindle C, rail A, and horizontal sheet of intervening elastic packing $e$, substantially as described.

9. The combination of the live-spindle D, the dead-spindle C, the chambered whir H, and the base B, projecting upward within the whir and supporting the dead-spindle above the lower surface of the whir, substantially as described.

DAVID HALL RICE.

Witnesses:
N. P. OCKINGTON,
LEPINE C. RICE.